United States Patent
Laurent et al.

(10) Patent No.: US 6,483,815 B1
(45) Date of Patent: Nov. 19, 2002

(54) POWER CONSUMPTION REDUCTION METHOD IN A DIGITAL MOBILE RADIO SYSTEM AND A MOBILE RADIO STATION

(75) Inventors: Eric M. F. Laurent, Caen (FR); Valere G. Delong, Arnage (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/253,077

(22) Filed: Feb. 19, 1999

(30) Foreign Application Priority Data

Feb. 20, 1998 (EP) .............................. 98400423

(51) Int. Cl.⁷ .............................. H04B 7/185
(52) U.S. Cl. ..................... 370/318; 455/574; 370/311
(58) Field of Search ................. 455/574; 370/311, 370/314, 318, 328, 332, 336, 337, 347, 442

(56) References Cited

U.S. PATENT DOCUMENTS 5,854,784 A * 12/1998 Solve et al. ............. 370/311
5,883,885 A * 3/1999 Raith ....................... 370/311
6,069,880 A * 5/2000 Owen et al. ............. 370/311
6,331,971 B1 * 12/2001 Raith ....................... 370/311

OTHER PUBLICATIONS

By "European Telecommunication Standard" ETS 300 578, Nineth Edition, Mar. 1997 as Published by ETSI. pp. 71–77, 86–100, 111, 163–165.
By GSM Digital Cellular Telecommunication, System (Phase 2); Radio Subsystem Link Control (GSM 05.08) pp. 1–35.

* cited by examiner

Primary Examiner—Daniel Hunter
Assistant Examiner—Tuan Tran
(74) Attorney, Agent, or Firm—Gwenaelle Le Pennec

(57) ABSTRACT

A power consumption reduction method for a mobile radio station in a digital mobile radio system is proposed. During a dedicated mode of the mobile radio station in which the mobile radio station should perform power measurements on BCCH carriers of neighboring cells, as many as possible measurements are squeezed in a single frame, within the stabilizing capabilities of a frequency synthesizer comprised in the mobile radio station. Next succeeding frames are freed of power measurements. In the time intervals freed from power measurements, the mobile radio station adopts a power down mode so that considerable power savings are achieved.

7 Claims, 3 Drawing Sheets

Figure 1:
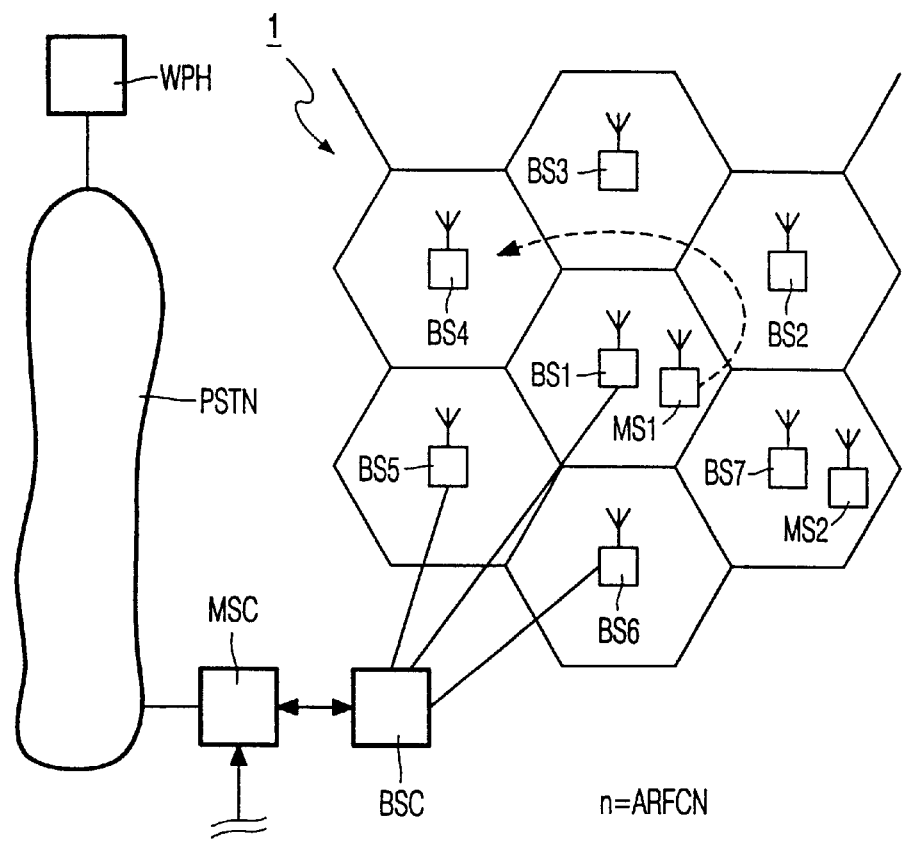

POWER CONSUMPTION REDUCTION METHOD IN A DIGITAL MOBILE RADIO SYSTEM AND A MOBILE RADIO STATION

The present invention relates to a power consumption reduction method in a digital mobile radio system as defined in the preamble of claim 1.

The present invention further relates to a mobile radio station.

Such a power consumption reduction method is described in Chapter 8.1.3 of the Draft European Telecommunication Standard ETS 300 578, Ninth Edition, March 1997 as published by ETSI, "GSM Digital cellular telecommunications system (Phase 2); Radio subsystem link control (GSM 05.08)". Generally, in digital mobile radio systems, such as a GSM system, RF power control is employed to minimize the transmit power required by a mobile or a base station subsystem whilst maintaining the quality of the radio links. By minimizing the transmit power levels, interference to co-channel users is reduced. Moreover, in a mobile it is important to save power because increased battery life increases call times and standby times. For the latter reason, manufacturers of mobiles are continuously striving to reduce power consumption in mobiles. In Chapter 8.1.3 of said ETSI document, it is prescribed how a mobile, in a dedicated mode, i.e. when assigned to a traffic channel or to a dedicated control channel, should perform received signal strength measurements on BCCH carriers of neighbouring cells. Such BCCH carriers are broadcast control channels for broadcasting general information on a transceiver base station per base transceiver station basis. In GSM, radio frequency channels are defined, and numbers are allocated to all the radio frequency channels available to the system. Each cell is allocated a subset of these channels, defined as the cell allocation. The BCCH carrier is a special radio frequency channel of the cell allocation which is used to carry synchronization information and said general information, including the organization of the so-called common control channels such as paging channels, random access channels, and access grant channels used for setting up radio links between mobiles and the GSM network. In Chapter 8.1.3, it is described that a mobile shall perform at least one power measurement on a neighbour cell carrier in evert TDMA (Time Division Multiple Access) frame. The measurements are reported to the radio network via a control channel. The radio network can make a handover decision on the basis of these measurements and/or on the basis of further measurements in the mobile and/or the radio network. The described method is not optimal as regards power saving in the mobile.

It is an object of the present invention to provide a power consumption reduction method in a mobile radio system whilst a mobile radio station is in a dedicated mode, in which power measurements on neighbour cells are optimized.

To this end the power consumption reduction method as defined in the preamble of claim has the characterizing features as claimed in the characterizing part of claim 1. Herewith, the mobile can be powered down during greater periods of time so that more power savings are obtained.

The present invention is based upon the insight that optimum use of the mobile's hardware, i.e. quick synthesizer stabilization and performing an optimum number of measurements per frame, creates the possibility to squeeze more measurements in a single frame, and that, therefore, other frames can contain less power measurements or even no power measurements at all. In these 'silent' periods, the mobile can adopt a power down mode. Herewith, more power savings are obtained as when applying the GSM Standard, and thus a longer call and standby time of the mobile. It is realized that the claimed method goes against the GSM Standard, but a proposal could be made for modifying the Standard. Furthermore, the far more optimal method as claimed in claim 1 could advantageously be applied in future mobile radio standards.

Embodiments are claimed in the dependent claims.

Figure 2:
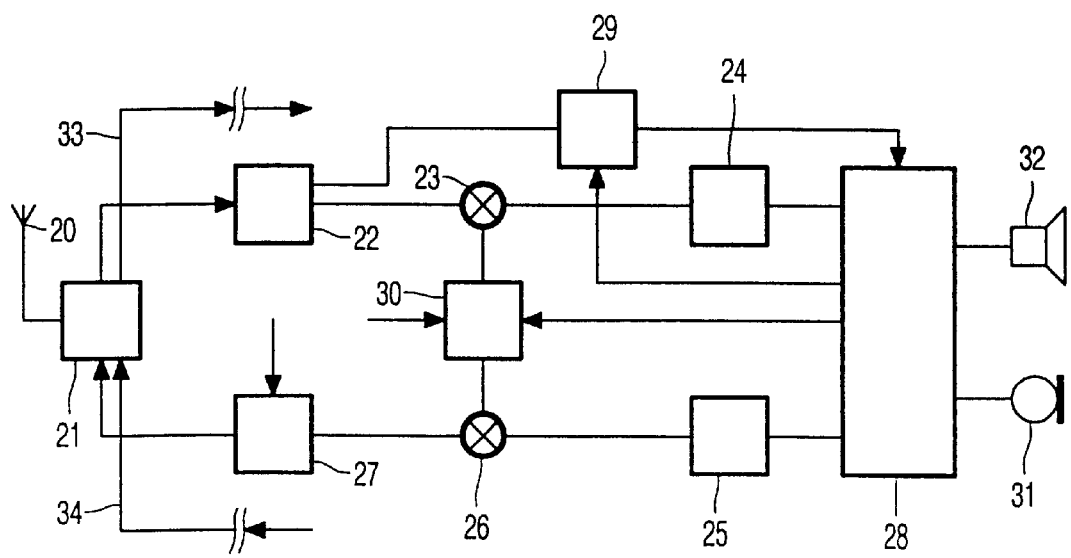
Figure 3:
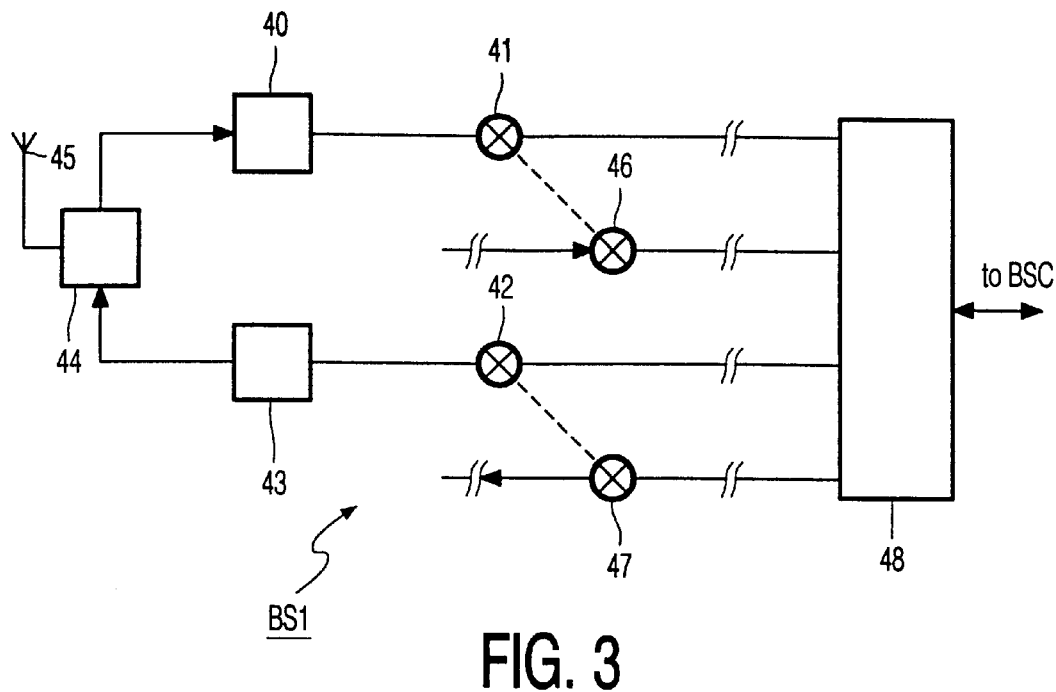
Figure 4:
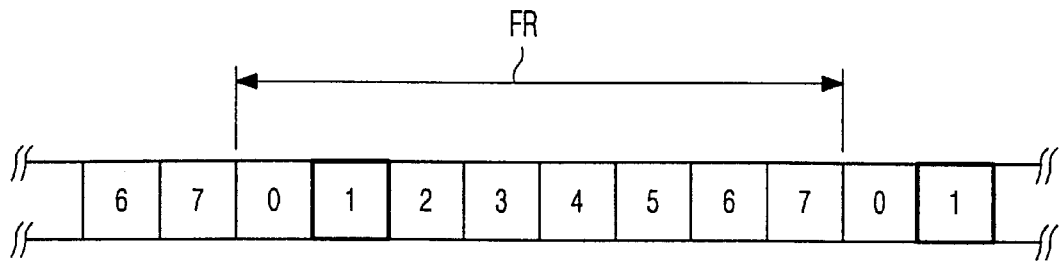
Figure 5:
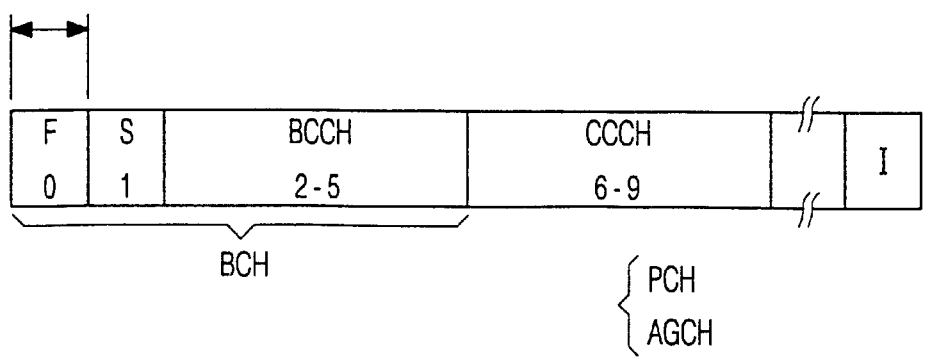
Figure 6:
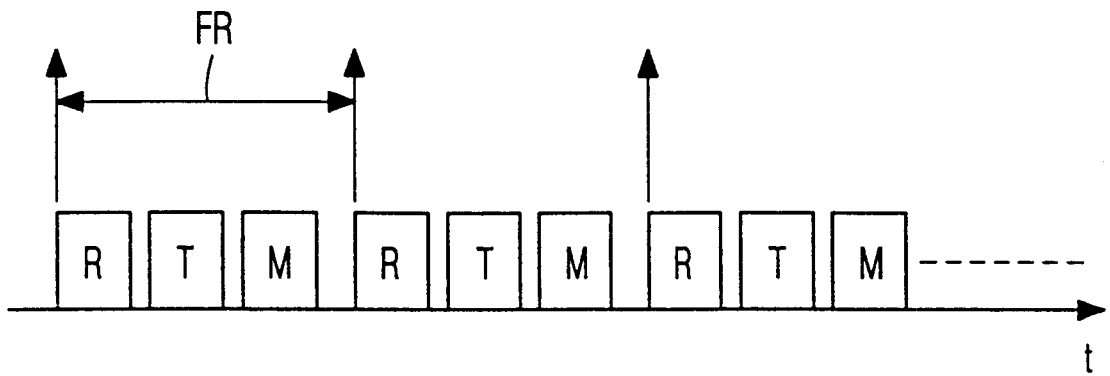
Figure 7:
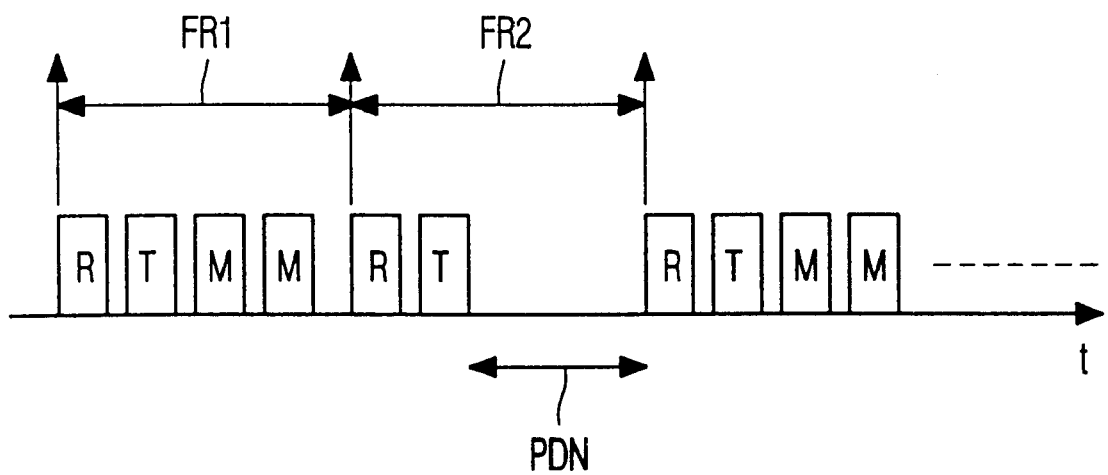

The present invention will now be described, by way of example, with reference to the accompanying drawings, wherein FIG. 1 schematically shows a digital mobile radio system according to the present invention, FIG. 2 shows a block diagram of a mobile radio station according to the present invention, FIG. 3 shows a block diagram of a radio base station, FIG. 4 shows a TDMA frame, FIG. 5 shows a combination of logical channels to be conveyed via a physical channel, FIG. 6 shows a prior art timing diagram for carrying out power measurements, and FIG. 7 shows a timing diagram illustrating the power consumption reduction method according to the present invention.

Throughout the figures the same reference numerals are used for the same features.

FIG. 1 schematically shows a digital mobile radio system 1 according to the present invention comprising a number of base stations BS1, BS2, BS3, BS4, BS5, BS6 and BS7 serving mobile radio stations in radio cells or zones they cover. The cells are indicated as hexagonal structures. Mobile radio stations MS1 and MS2 are shown in FIG. 1. The mobile radio station is near the radio base station BS1 so that most likely BS1 is the serving base station and BS2 to BS7 are neighbouring base stations or most likely non-serving base stations. A dashed line from the mobile radio station MS1 indicates that the mobile radio station MS1 may roam through the mobile radio system 1. When the mobile radio station MS1 is roaming, another base station may become the serving station. Further shown is a base station controller BSC which is coupled to a number of base stations, in the example given the radio base stations BS1, BS5 and BS6. The base station controller BSC is coupled to a mobile switching centre MSC to which further base station controllers can be coupled. Some mobile switching centres have a gate to a public switched telephone network PSTN of fixed network subscribers such as the wired phone WPH. To the fixed network PSTN also other mobile phone systems may be coupled. Mobile phone systems operated by different operators may cover geographically disjunct or overlapping areas, and may share the same frequency band or operate in different frequency bands. Frequencies are allocated to different operators such that, in principle, the various systems do not interfere with each other. Such a digital mobile radio system 1 can be a GSM system operating in the 900 MHz band and/or a DCS 1800 system operating in the 1800 MHz band or any combination of systems operated by the same or by different operators. In the example given, the mobile radio system is a GSM and/or DCS 1800 system and/or PCS system (a derivative of DCS 1800, in the USA, operating in the 1900 MHz band), so that the system can be a single, a dual or a triple band system. The combination can also be E-GSM (Extended GSM)+DCS 1800+PCS. A GSM system as standardised by ETSI (European Telecommunications Standards Institute), is a digital mobile radio system having two 25 MHz bands, an 890–915 MHz uplink band in which mobiles transmit to the network, and a 935–960 downlink band in which base stations transmit to mobiles, frequency channels within these bands having a 200 kHz bandwidth. Radio communications between mobiles and base stations is full duplex with a 45 MHz duplex spacing. The GSM system has 124 active frequency channels which have been given absolute radio frequency channels numbers ARFCN. Herewith, the frequencies in the uplink and downlink bands are defined as 890 MHz+0.2 MHz*n, and the frequency of the uplink channel+45 MHz, respectively. A radio cell usually has between 1 and 16 frequencies which can be assigned to a mobile in a cell on an FDMA basis (Frequency Division Multiple Access). In so-called E-GSM (Extended GSM), there are 174 frequency channels. In DCS 1800, the uplink occupies a 1710–1785 MHz band, and the downlink an 1805–1880 MHz band, the duplex spacing being 95 MHz. With a frequency channel bandwidth of 200 MHz, DCS 1800 has 374 frequency channels. To distinguish from GSM and E-GSM, DCS 1800 has ARFCNs in a range 512 to 885. In all these systems, physical radio channel resources are allocated on an FDMA and TDMA (Time Division Multiple Access) basis. In TDMA, each frequency is further subdivided into eight different time slots numbered from 0 to 7, each of which can be assigned to a mobile phone subscriber or user. A set of eight time slots form a physical frame, in GSM having a duration of 4.615 msec. For a more detailed description of a GSM system, referred is to the handbook "An Introduction to GSM", S. M. Redl et al., Artech House, Inc., 1995, pp. 71–77, 86–100, 111, and 163–165.

FIG. 2 shows a block diagram of the mobile radio station MS1 according to the present invention. The mobile radio station MS1 comprises an antenna 20 which is coupled to a receive path and a transmit path via a duplexer 21. The receive path comprises an RF-amplifier and filter 22, a down-mixer 23 and a demodulator 24, and the transmit path comprises a modulator 25 an up-mixer 26, and a power amplifier 27. The demodulator and modulator 24 and 25 are coupled to a baseband and audio processing and control unit 28 comprising components such as a digital signal processor, programmed memory and random access memory, input/output ports for controlling components in the mobile radio station MS1, and other processing capabilities well known in the art. Further shown are a received signal strength indicator 29 for measuring the field strength of the received radio channel, the indicator 29 being coupled between the radio part and the control unit 28, a controllable frequency synthesizer 30 for adjusting a desired radio channel, a microphone 31 and a speaker 32. With further receive and transmit path 33 and 34, having a similar construction as the described receive and transmit path, it is indicated that the mobile radio station can be a multi-band station, e.g. a dual band station being able to receive GSM and DCS 1800 signals or a triple band station being able to receive signals from three different systems. In the mobile station MS1, integrated circuits and other circuits comprising the shown blocks may be powered down by the unit 28 so as to reduce power consumption. In the sequel, power consumption reduction according to the present invention will be described.

FIG. 3 shows a block diagram of the radio base station BS1 comprising a number of transceivers of which one transceiver is shown in more detail. The shown transceiver comprises a receive path comprising an RF amplifier/filter 40 and a down-mixer 41, and a transmit path comprising an up-mixer 42 and a power amplifier 43, the amplifier/filter and the power amplifier being coupled to a duplexer 44 which is further coupled to an antenna 45. Further mixers and 47, and dashed lines between mixers indicated a repetition of the same transceiver structure. All mixers are coupled to a programmed computer apparatus 48 via demodulators and modulators (not shown in detail), the apparatus 48 being programmed such as to carry out well-known signalling tasks in the GSM system, and base station internal control tasks.

FIG. 4 shows a TDMA frame FR. In the example given, a time slot numbered 1 is assigned to a mobile radio station. To save power, the mobile at least switches off its transmitter during intermediate time slots numbered 2 to 7 and 0. In GSM, uplink and downlink time slots are offset by three slots. Herewith, full duplex operation is achieved on a TDD basis (time division duplex). The described physical FDMA/TDMA channels structure of frequencies and time slots is the conveying means for conveying logical traffic and control data.

FIG. 5 shows a combination of logical channels to be conveyed via a physical channel. The logical channels, traffic and control channels, are mapped onto the shown physical channels. Shown is an 51 frames multi-frame signalling frame of a logical channel combination conveyed on a physical channel in the downlink direction. For initial synchronisation of a mobile to the mobile radio network, the 51-multi-frame a frequency correction channel F in frame numbered 0, and a synchronisation channel in the succeeding frame. Frames 2–5 carry BCCH data, system messages broadcast from a radio base station to mobiles, and frames 6–9 carry common control channels, such as paging channels PCH for paging a mobile, and access grant channels to grant a dedicated signal to a mobile upon request. After frequency and time synchronisation to the network, a mobile reads system and cell data from the BCCH. The shown 51-multi-frame can be transmitted on any frequency available to a cell, but is always transmitted on a time slot numbered 0. Herewith, a mobile can always easily find synchronisation information and system broadcast messages. The frequency on which this combination is transmitted is used as a reference in the neighbouring cells to mark it as an adjacent cell, i.e mobiles in neighbouring cells perform their periodic measurements on this frequency during time slot 0.

FIG. 6 shows a prior art timing diagram for carrying out power measurements. In said Chapter 8.1.3 of the Draft European Telecommunication Standard ETS 300 578, it is specified how a mobile shall perform power measurements, i.e. field strength measurements, on neighbour cell BCCH carriers whilst in dedicated mode. It is prescribed that the mobile radio station MS1, which is in dedicated mode, shall perform at least one power measurement on a neighbour cell in each TDMA frame FR of the measurement period. Measurement results are reported to the mobile radio network via an associated channel. From a power saving point of view such a measurement scheme is inefficient. In FIG. 6, "R" indicates reception and equalisation of a burst received in a time slot of the serving cell, in the example given the cell covered by the radio base station BS1, "T" indicates transmission of a burst by the mobile radio station in the serving cell, and "M" indicates power measurements on BCCH carriers of neighbouring cells. Via the BCCH, the mobile radio station MS1 is informed about these neighbouring BCCH carriers.

FIG. 7 shows a timing diagram illustrating the power consumption reduction method according to the present invention. Within the stabilizing capabilities of the frequency synthesizer 30, as many as possible power measurements are squeezed in a single frame. In one embodiment, in a frame FR1 two power measurements are done, and an immediately succeeding frame FR2 is free of power measurements. Herewith, radio circuitry can be powered down during a period PDN so that power saving are achieved. If three power measurements can be squeezed in a single frame, the next two succeeding frames can be made free of power measurements and in these frames the mobile radio station can adopt a power down mode. Herewith, even more power savings are obtained. On an overall basis it can still be arranged that the measurements bursts are as evenly distributed as possible, although the number of degrees of freedom increases with the number of additional measurements that can be squeezed in a single frame. Herewith, a mechanism closer to the current GSM Standard is obtained. The dedicated mode can be a call mode or a dedicated signalling mode.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. In a digital mobile radio system including frequency division and time division radio resources in the form of frames of time slots at radio frequency carriers, which system comprises at least one radio base station and a plurality of mobile radio stations, a power consumption reduction method comprising the following steps, when a mobile radio station is in a dedicated mode, a) performing of power measurement by the mobile radio station, during a reporting period, of neighbour channel carriers of radio base stations covering cells which are neighbouring cells of the cell serving the mobile radio station, characterised in that the power consumption reduction method further comprises the steps of b) performing an optimal number of power measurements per frame as permitted by the radio frequency hardware of the mobile radio station so as to get meaningful measurement samples, c) non-evenly distributing the power measurements over the frames of the reporting period, and d) powering down the mobile radio station during time intervals which would have needed for carrying out power measurements if the power measurements per frame were evenly distributed over the frames of the reporting period.

2. A power consumption reduction method as claimed in claim 1, wherein the power measurements are made every n frames, n being an integer greater than 1, and power consumption reduction is obtained during other frames.

3. A power consumption reduction method as claimed in claim 2, wherein n equals two.

4. A power consumption reduction method as claimed in claim 1, wherein a maximum number of measurements is squeezed per single frame, and on an overall basis a uniform as possible distribution of the required number of measurements over the reporting period is applied, so as to create a maximum number of measurement free frames.

5. A power consumption reduction method as claimed in claim 1, wherein the dedicated mode is a call mode.

6. A power consumption reduction method as claimed in claim 1, wherein the dedicated mode is a mode in which a dedicated channel has been assigned to the mobile radio station for call setup or for exchange of dedicated information between the mobile radio station and a network including the radio stations.

7. A mobile radio station in a digital mobile radio system including frequency division and time division radio resources in the form of frames of time slots at radio frequency carriers, which system comprises at least one radio base station, the mobile station comprising:

power measurement mean for performing of power measurements during a reporting period of neighbor channel carriers of radio base stations covering cells which are neighboring cells of the cell serving the mobile station, wherein the power measurement means performs an optimal number of power measurements per frame as permitted by the radio frequency hardware of the mobile radio station so as to get meaningful measurement samples, and the power measurements are non-evenly distributed over the frames of the reporting period and wherein the mobile station is powered down during time intervals which would have needed for carrying out power measurements if the power measurements per frame were evenly distributed over the frames of the reporting period.

* * * * *